United States Patent [19]

Klinteberg et al.

[11] 4,285,526
[45] Aug. 25, 1981

[54] SEALING DEVICE FOR BEARINGS, ESPECIALLY ROLL BEARINGS

[75] Inventors: G. Rune Klinteberg; N. A. Bertil Johansson; B. Lennart Johansson, all of Landskrona; Christer H. Dahlgren, Scalöv, all of Sweden

[73] Assignee: Stefa Industri Aktiebolag, Landskrona, Sweden

[21] Appl. No.: 78,812

[22] Filed: Sep. 25, 1979

[51] Int. Cl.³ .............................................. F16J 15/32
[52] U.S. Cl. .................................. 277/153; 308/187.1
[58] Field of Search ................... 277/153, 152, 212 C, 277/164, 235 R, 212 R; 308/187.1

[56] References Cited

U.S. PATENT DOCUMENTS

| 3,363,911 | 1/1968 | McKinven | 277/153 |
| 3,762,726 | 10/1973 | Jornhagen | 277/153 |
| 4,165,811 | 8/1979 | Salter | 277/152 |

*Primary Examiner*—Lenard A. Footland
*Attorney, Agent, or Firm*—Larson, Taylor and Hinds

[57] ABSTRACT

A sealing device for bearings in which two sealing areas are provided in series, each comprising an elastomeric sealing lip, the lips being part of a single ring and contacting cylindrical surfaces of a surrounding housing, the sealing ring being attached to a metallic liner.

6 Claims, 1 Drawing Figure

U.S. Patent  Aug. 25, 1981  4,285,526
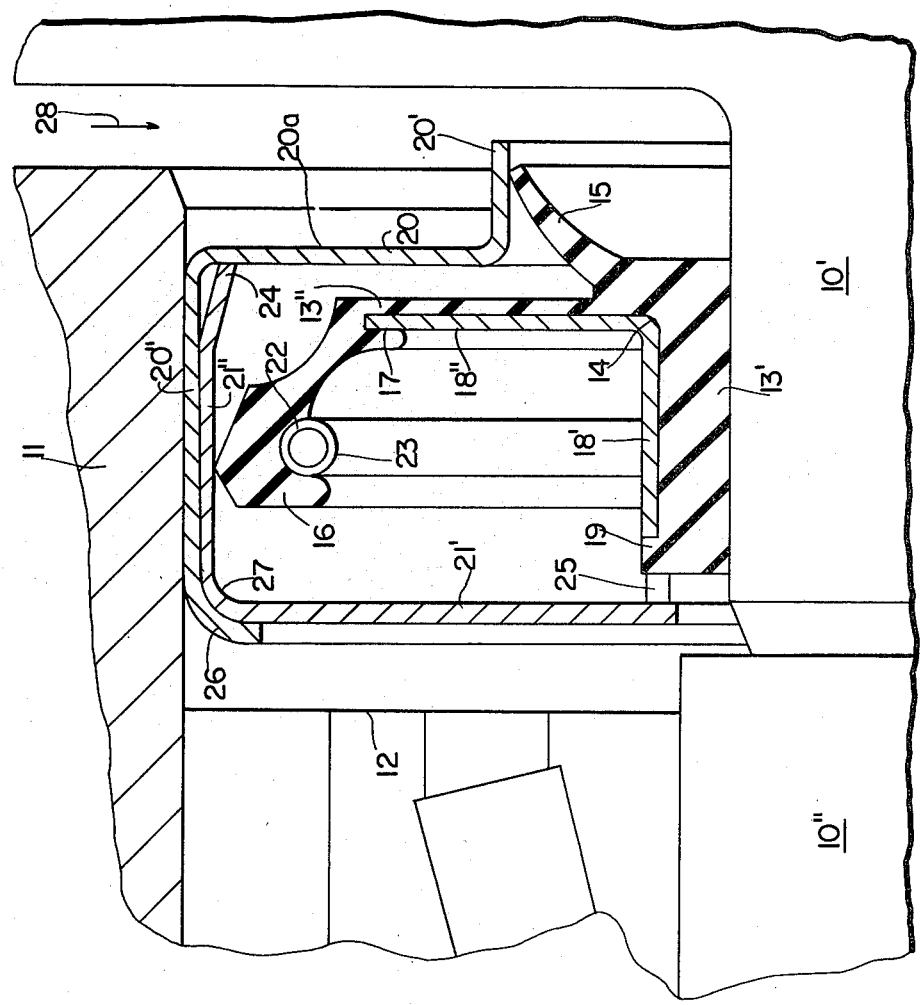

SEALING DEVICE FOR BEARINGS, ESPECIALLY ROLL BEARINGS

FIELD OF THE INVENTION

The present invention relates to sealing devices for bearings in rotational apparatus and machines, in which either a shaft rotates within a hub or a hub rotates relative to a shaft, the shaft in the latter case not rotating.

BACKGROUND AND SUMMARY

For such bearing devices, ball bearings or roll bearings are used to a great extent, and these should be well embedded in oil or grease for lubrication. In bearings of this type it is desired to avoid leakage of the grease or the oil to the space outside of the bearing, but it is also important to avoid the entry of rigid foreign particles into the ball bearing or roll bearing. Therefore, it has already been proposed for this purpose to provide two sealing rings or surfaces acting after each other, in the form of an elastomeric body usually of rubber, in contact against smooth surfaces, whereby the ring positioned adjacent to the bearing has been intended primarily to prevent leakage of grease and oil to the outside, whereas the ring positioned more remote from the bearing was intended primarily to prevent the entry of rigid foreign particles into the bearing. Of course, the two sealing rings will also each function as a security or back-up for the specific purpose for which the other sealing ring is primarily intended. The sealing rings, usually made from rubber, are shaped with a sealing lip, contacting a smooth cylindrical metallic surface.

Sealing devices of this type necessarily involve a lot of different structural details, such as the two elastomeric rings and the two metallic surface parts against which the elastomeric rings are in contact, and often some additional protection parts. Both the elastomeric rings and the metallic surfaces contacted by the elastomeric rings are subject to wear, and therefore it has earlier been regarded desirable that each of these parts should be replaceable. Accordingly, all of the components of the sealing device were usually mounted at the place of manufacture of the machine.

Applicants have found that the wear of the elastomeric ring as well as of the metallic surfaces is promoted to a substantial extent if these parts are not mounted in the exactly correct position relative to each other when mounting together with the bearing, especially as to their position in axial direction. Applicants have also found that if the sealing device is mounted or assembled together at the machinery workshop when building it into the machine concerned, the mounting is often done incorrectly. This may stem from lack of skill of the worker, but perhaps to a greater degree stems from the fact that he usually or frequently does not have at his disposal such alignment devices, jigs or the like, which are available to the manufacturer of the sealing device. Accordingly, applicants are of the opinion that it is advantageous if the entire sealing device is arranged in such a way that it can be delivered to the manufacturer of the machine without the component being assembled together and mounted in the machine manufacturer's workshop, even if such a mounting in the form of a unitary aggregate would mean that when some singular component becomes worn, this can no longer be replaced individually, but the entire sealing aggregate will have to be replaced. By making the sealing device in the form of a closed aggregate, other advantages are also gained, such that the useful life of the device will be longer so that it becomes economically defensible to make the sealing device in a way which precludes the easy replacement of some separate part thereof. Thus, it is advantageous that by building the sealing devide into a closed or unitary aggregate, it is possible more easily to assemble the elastomeric rings and the metallic parts contacted by them in such a way that the component parts are well protected against damage during transport, storing or other handling. Also, the dimensions, especially those in the axial direction, of the aggregate device can be less as compared with the corresponding dimensions of a device having releasable and replaceable component parts. By mounting the components as a unitary aggregate, the possibility of conducting away heat generated within the aggregate can be improved, and this may be further enhanced by providing protection means for enclosing the parts within the aggregate in a suitable way, whereby the friction-generated heat between the elastomeric ring and the contact surfaces can be removed in an advantageous way.

The invention thus relates to a sealing device for bearings, especially roll bearings, in which two sealing places or areas are provided in series, each of which comprises a sealing lip made from an elastomer, preferably rubber, and arranged on one single ring of the same elastomer, for contacting a surface which is cylindrical at the point of contact, the sealing ring being attached to a metallic liner.

Generally in accordance with the invention, the sealing lips are arranged to extend from one single ring-formed part, but to mutually different radial differences from the axis of the sealing device, the sealing device being enclosed in a casing comprising two parts, one of the parts having a Z-shaped profile and the other one having an L-shaped profile, so that the outermost parts of the two parts, which are at least substantially cylindrical, tightly contact each other, the edge of one part being folded over a cavetto-shaped part of the other one, the inner one of the two cylindrical parts forming a contact surface for one of the sealing lips, whereas the at least substantially cylindrical surface of the part of Z-shaped profile adjacent to the shaft forms a contact surface for the other sealing lip.

The invention will be described hereafter in connection with a preferred form of execution illustrated in the appended drawing, but it is to be understood that the invention is not limited to this specific form, but rather that different modifications may exist within the scope of the invention.

BRIEF DESCRIPTION OF THE DRAWING

The single drawing FIGURE is an axial sectional view of a preferred embodiment of a sealing device in accordance with the invention.

DETAILED DESCRIPTION OF A PREFERRED EMBODIMENT

In the drawing a shaft 10 and a hub 11 are shown, the shaft rotating within the hub. However, a contrary arrangement may be used, such that the shaft will be stationary, with the hub rotating. Of course, both of these parts may be rotatable, dependent upon the type of machine within which the bearing is provided. The shaft comprises two parts 10' and 10" connected to each other, but the particular form of part 10" is of no importance. As shown in the drawing, it may for instance carry the interior ring of a roll bearing, a ball bearing or the like. The shaft part 10', however, carries the sealing device according to the present invention. The bearing is only schematically indicated in the drawing by means of the contour 12.

A ring 13 formed from an elastomer, such as rubber, is mounted on the shaft part 10'. In order better to attach it to the shaft, it may be provided with a wave-shaped profile in the opening for the shaft, but this detail, which is known per se, does not form part of the present invention. The elastomeric ring 13 has a generally L-shaped profile, whereby it comprises the basic part 13' applied to the shaft part 10', and the arm part 13", which is at least generally perpendicular to the direction of the shaft. In the cavetto 14 between the two parts 13' and 13", the inner sealing lip 15 is branched off in a direction outwardly, and at the outer edge of the part 13" the outer sealing lip 16 is arranged, the part 13' also including an inwardly open groove 17 in which the radial part 18" of a liner 18 is located. This liner 18 also has a generally L-shaped profile, and thus comprises not only the part 18" but also an axial concentric part 18'. The liner 18 and the elastomeric ring 13 preferably are vulcanized together, and for establishing the position of the liner 18 in relation to the elastomeric ring 13, and annular flange 19 is provided on the elastomeric ring 13 adjacent the bearing 12, the edge of the part 18' of the liner resting against this flange.

The complete sealing device is enclosed within a cover, comprising two parts 20 and 21. The part 20 has a generally Z-shaped profile and contains the generally radial part 20a, a first axial concentric part 20' located relatively adjacent to the shaft 10, and a second axially concentric part 20" inserted into the hub. The sealing lip 15 contacts under resilient pressure the inner surface of the part 20' of the Z-shaped cover part 20.

The second part 21 of the cover is of a generally L-shaped profile such that its axial concentric part 21" contacts the interior surface of the axial concentric part 20" of the cover part 20 of Z-shaped profile, whereas its substantially radial part 21' extends toward the shaft 10, but without contacting the shaft.

The sealing lip 16 contacts the interior surface of the axial concentric 21" of cover part 21. For providing the necessary sealing pressure, a circular groove 22 is provided on the inner side of sealing lip 16, and contains an expansion spring 23.

For establishing the mutual positions of the different parts, a number of measures have been taken. Thus, the free edge 24 of axial concentric part 21" of cover part 21 may be dimensioned and shaped in such a way that the two cover parts will be correctly mutually positioned when free edge 24 contacts the interior surface of radial part 20a of cover part 20. Further, elastomeric ring 13 may be shaped with a number of joggles 25 distributed around its end which faces the bearing, the joggles having such a width that they will contact the interior side of radial part 21' of cover part 20 upon correct mounting of the two cover parts. Thus, correct mutual positioning is secured between the two cover parts, and thereby also correct positioning of the two sealing lips 15 and 16 in relation to the cylindrical surfaces contacted by them.

When assembling the sealing device in accordance with the preferred procedure, after the liner 18 has been attached to the elastomeric ring 13 by vulcanization, the spring 23 is inserted in place. The aggregate thus formed is inserted into the cover part 20, and suitably a jig or the like should be used for determining the correct depth of insertion. Thereafter, the cover part 21 is positioned in place inside of the axially concentric part 20" of cover part 20, and free edge 26 is folded around to press onto the cavetto 27 of cover part 21. The sealing device is then ready to be introduced into place in the machine where it is ultimately to be used as a seal for a bearing, such as a wheel bearing of an automobile or the like.

The device thus comprises a comprehensive aggregate comprising the two sealing areas at the lips 15 and 16, these lips being in correct position in relation to their contact surfaces so that the best possible sealing effect will be obtained. The bearing 12 usually is filled with oil or grease, either of which due to heat will have a more or less liquid consistency, and it is important that this lubrication agent does not leak out of the bearing 12. This is prevented in the first place by means of the sealing lip 16 in contact with the surface on the interior side of axially concentric part 21". If, in spite of this, some lubricant should leak past this sealing area, it will encounter the seal between the lip 15 and the surface contacted by this lip, this sealing area following in series after the first mentioned sealing area. The latter mentioned sealing area, on the other hand, is intended in the first place to prevent rigid foreign particles from entering into the bearing such as in the direction of arrow 28, but should there be some deficiency in this seal, such foreign particles would then encounter the sealing lip 16. It should be noted that sealing devices of the type here described are preferably used for sealing of wheel shafts in automobiles, and it is imperative that road gravel and similar small rigid particles do not enter into the wheel bearing.

Creation of heat by friction cannot be avoided in the sealing surfaces of devices of this type, and this heat must be conducted away in some way or another in order that the elastomer in the sealing areas shall not be damaged. In the present device, the two sealing lips 15 and 16 contact the interior surfaces of the cover parts, which are made from metal, and thus form good heat conductors. Cover part 20 in turn contacts the hub over a very substantial surface represented by the exterior surface of axial concentric part 20", such that efficient heat conduction will exist.

In the present invention, the advantage of other constructions whereby single component parts may easily be replaced upon wear has been given up, but in compensation thereof the instant invention has the advantage of a very simple mounting because both of the sealing areas are built into one single aggregate, and this aggregate requires less space, especially in the axial direction, than was possible in older constructions. Additionally, the entire sealing aggregate may be manufactured in a seal manufacturing factory where it is more possible to ensure that the sealing lips 15 and 16 contact correctly and advantageously the assigned areas of the metallic surfaces. All of the sealing device itself is well covered, whereby out-leakage of lubricant and in-leakage of impurities is effectively prevented.

We claim:

1. Sealing device for bearings especially roll bearings, in which two sealing places (15-20', 16-21") are provided in series, each comprising a sealing lip (15, 16) made from an elastomer, and arranged on one single ring (13) made from the same elastomer for contacting a cylindrical surface at the sealing places, said sealing ring (13) being connected to a metallic liner (18), characterized thereby, that the sealing lips (15, 16) are arranged to extend from one single ringshaped part (13) but at different radial distances from the axis of the sealing device, the sealing device being covered by a housing comprising two parts (20, 21), one of said parts (20) having a Z-shaped profile and the other one (21) having an L-shaped profile, so that the at least substantially cylindrical outermost parts of the two last mentioned parts (20, 21) tightly contact each other, and the edge of the one (20) of them being folded over a cavetto shaped part of the other one (21), two cylindrical portions of the housing parts forming contact surfaces for respective ones of the two sealing lips (15, 16).

2. A sealing device according to claim 1, characterized thereby, that the member of L-shaped profile (21) of the cover contacts with the free edge of the axially concentrical branch (21″) the interior side of the radial branch (20a) of the member (20) of Z-shape profile.

3. A sealing device according to claim 1 or 2, characterised thereby that the radial branch (21′) of the cover part (21) of L-shaped profile contacts joggles (25), provided at one end of the elastomeric ring (13).

4. A sealing device according to claim 1, characterized thereby that the elastomeric ring (13) is provided with a liner (18) of L-shaped profile, the radial branch of which being inserted into a groove (17) in the elastomeric ring and the axially concentrical branch of which (18′) resting against an outwardly directed flange (19) on the axially concentrical branch (13′) of the elastomeric ring (13).

5. A sealing device according to claim 1, characterized thereby that the elastomeric ring (13) is attached to its liner (18) by vulcanization.

6. A sealing device according to claim 1, characterized thereby that the outer one (16) of the two sealing lips comprises on its interior side a groove (22), in which an expansion screw spring (23) running all around is introduced.

* * * * *